Patented Jan. 30, 1923.

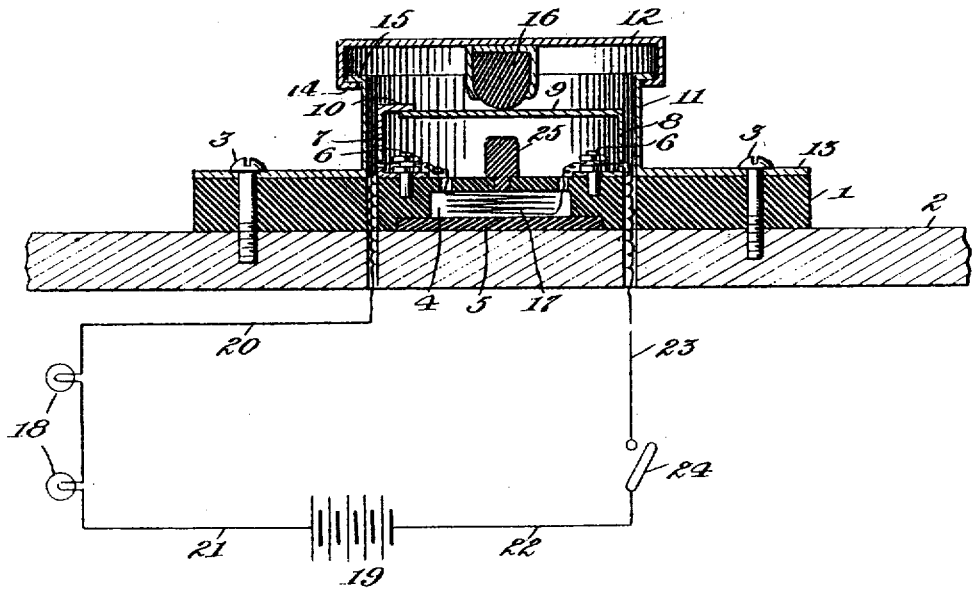

1,443,471

UNITED STATES PATENT OFFICE.

WALTER S. HAMBURGER, OF BALTIMORE, MARYLAND.

HEADLIGHT DIMMER.

Application filed October 16, 1922. Serial No. 594,788.

*To all whom it may concern:*

Be it known that I, WALTER S. HAMBURGER, a citizen of the United States, residing at Baltimore, and State of Maryland, have invented certain new and useful Improvements in Headlight Dimmers, of which the following is a specification.

The present invention relates to headlight dimmers and has for its object the provision of improved means for reducing or dimming, at will, the intensity of illumination of the headlights of automobiles or the like.

In carrying out my invention I provide a device adapted to be mounted on the floor of an automobile vehicle, for example, in front of the seat of the driver, and comprising a member adapted to be depressed by the foot for switching into the lighting circuit a sufficient amount of resistance to reduce the intensity of the electric headlights to the desired extent.

The invention is illustrated on the accompanying drawing, in which the figure is a central vertical section of a dimmer embodying my invention, showing the same connected in the circuit of a pair of headlights and a source of current.

The dimmer comprises a suitable base 1 of insulating material adapted to be secured to the floor 2 of the automobile or the like by means of screws 3. The base 1 is provided in its under side with a central cavity 4 adapted to be closed by a plate 5, preferably of the same material as the base, and which may be secured in position in any suitable manner, as by cement.

On the upper face of the base 1 are mounted, by means of screws 6, the two parts 7 and 8 of a resilient metal switch, the part 8 having a relatively long spring arm 9 engaging at its free end beneath the relatively short arm 10 of the part 7.

Surrounding the switch is a metal housing comprising a cylindrical lower member 11 and a cover member 12. The member 11 is provided at its lower edge with an outturned flange 13, and the screws 3 pass therethrough and secure the member 11 to the base 1. The cover 12 has an inturned edge flange 14 which co-operates with the outturned upper edge 15 of the member 11 to prevent the parts of the housing from being completely separated, at the same time permitting relative axial movement there-between. The cover 12 carries a button 16 of insulating material which bears on the spring arm 9 of the switch.

Arranged within the cavity 4 of the base 1 is a resistance coil 17, having its terminals secured under the heads of the screws 6. As shown, the headlights 18 are connected in series with each other and with the battery 19 by the wires 20, 21, 22 and 23, the wires 20 and 23 passing through the floor of the automobile or the like and through the base 1 of the dimmer device, as shown, and having their ends secured under the heads of the screws 6. The usual dashboard switch 24 is also interposed in the circuit.

With the parts of the device in the position illustrated on the drawing, the resistance coil 17 is short-circuited by the resilient metal switch 7, 8, the latter offering little resistance to the passage of the current, so that practically no current passes through the resistance coil. When it is desired to dim the headlights, the driver places his foot lightly on the cover 12 with the button 16 and depresses it thereby moving the spring arm 9 out of contact with the arm 10, an insulated stop member 25 being provided on said base to limit the downward movement of said spring arm to prevent contact therewith of the screw 6. All of the current is then compelled to pass through the resistance coil 17 and the headlights are dimmed. When the driver removes his foot from the cover 12 the spring arm 9 again makes contact with the arm 10, whereby the resistance coil is short-circuited by the switch 7, 8, and the headlights again become bright.

Having thus described one form in which my invention may be embodied, it being understood however that modifications may be made without departing from its scope, what I claim and desire to secure by Letters Patent is:

A headlight dimmer, comprising a base member of insulating material adapted to be secured to the floor of an automobile and having a cavity therein opening through one face of said base member, a dimming resistance arranged in said cavity, a plate of insulating material secured to said base member and closing the mouth of said cavity, a switch comprising a stop and a spring arm secured to said base member by posts having the terminals of said resistance secured thereto, said arm being normally maintained by its own resiliency in contact with said stop, and a housing mounted on said base member and enclosing said switch, said housing having a depressible metal cover, provided with a button of insulating material engaging said spring arm, whereby when said cover is depressed said spring arm is moved out of contact with said stop to open said switch.

In testimony whereof I affix my signature.

WALTER S. HAMBURGER.